United States Patent
Koskan et al.

(10) Patent No.: US 10,531,048 B2
(45) Date of Patent: Jan. 7, 2020

(54) SYSTEM AND METHOD FOR IDENTIFYING A PERSON, OBJECT, OR ENTITY (POE) OF INTEREST OUTSIDE OF A MOVING VEHICLE

(71) Applicant: MOTOROLA SOLUTIONS, INC, Chicago, IL (US)

(72) Inventors: Patrick D Koskan, Jupiter, FL (US);
Fabio M Costa, Weston, FL (US);
Craig Siddoway, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 24 days.

(21) Appl. No.: 15/379,623

(22) Filed: Dec. 15, 2016

(65) Prior Publication Data
US 2018/0176457 A1 Jun. 21, 2018

(51) Int. Cl.
*H04N 7/18* (2006.01)
*H04N 5/232* (2006.01)
*G06F 3/16* (2006.01)
*H04N 5/77* (2006.01)
*G06K 9/00* (2006.01)

(52) U.S. Cl.
CPC ............. *H04N 7/181* (2013.01); *G06F 3/167* (2013.01); *G06K 9/00751* (2013.01); *H04N 5/23238* (2013.01); *H04N 5/77* (2013.01); *H04N 7/188* (2013.01); *H04N 5/23219* (2013.01)

(58) Field of Classification Search
CPC ........... H04N 5/23216; H04N 5/23219; H04N 7/181; H04N 7/188; H04N 5/23238; G06F 3/16; B60R 11/04; B60R 1/00; B60R 2300/102; G06K 9/00255; G06K 9/00288; G06K 9/00791
See application file for complete search history.

(56) References Cited

U.S. PATENT DOCUMENTS

| | | |
|---|---|---|
| 6,924,832 B1 * | 8/2005 | Shiffer .................... G06T 7/248 348/36 |
| 7,697,725 B2 | 4/2010 | Burns et al. |
| 9,118,886 B2 | 8/2015 | Wang et al. |
| 9,262,924 B2 | 2/2016 | McNew |
| 9,367,951 B1 | 6/2016 | Gray et al. |
| 9,398,214 B2 | 7/2016 | Ahiska |
| 9,402,053 B2 | 7/2016 | Fagadar-Cosma et al. |
| 9,405,982 B2 | 8/2016 | Zhang et al. |
| 9,418,653 B2 | 8/2016 | Sekiguchi et al. |

(Continued)

*Primary Examiner* — Tat C Chio

(57) ABSTRACT

A process for identifying a person, object, or entity (POE) of interest outside of a moving vehicle includes first receiving, from a camera coupled to the vehicle, a video stream having a field-of-view (FOV) of an area surrounding the vehicle. A first trigger is detected associated with a vehicle occupant's indicated desire to capture a portion of the video stream. A selected FOV sub-portion of the video stream less than then an entire captured FOV of the video stream is identified as a function of the trigger or a separate electronic sensor input. A second trigger is detected indicative of the vehicle occupant's indicated desire to stop capturing the portion of the video stream. The video stream is then sub-selected in time and FOV as a function of the foregoing to create a second modified video stream and provided to a target device for display.

20 Claims, 6 Drawing Sheets

(56) References Cited

U.S. PATENT DOCUMENTS

| | | | |
|---|---|---|---|
| 2009/0189373 A1* | 7/2009 | Schramm | B60K 35/00 |
| | | | 280/731 |
| 2009/0240108 A1* | 9/2009 | Shimizu | A61B 1/041 |
| | | | 600/109 |
| 2016/0005435 A1* | 1/2016 | Campbell | H04N 9/806 |
| | | | 386/240 |
| 2016/0137126 A1* | 5/2016 | Fursich | B60R 1/00 |
| | | | 348/38 |
| 2017/0323540 A1* | 11/2017 | Boykin | G08B 13/19613 |

* cited by examiner

SYSTEM AND METHOD FOR IDENTIFYING A PERSON, OBJECT, OR ENTITY (POE) OF INTEREST OUTSIDE OF A MOVING VEHICLE

BACKGROUND OF THE INVENTION

As the number of fixed cameras available and accessible across urban and suburban areas increases, the opportunity and ability to identify objects relative to objects of interest in real-time correspondingly increases as well. In addition to fixed cameras, mobile cameras such as body cameras and vehicular forward-facing and/or 360° cameras have also begun to proliferate. With the amount of recorded video continuously increasing across all modes of video recording, the ability to uniquely identify and track a particular person, object, or entity (POE) of interest becomes more important. However, technical solutions for more narrowly identifying portions of recorded video and sub-selecting such narrow portions of video have not kept up with the proliferation of mobile cameras, and especially vehicular cameras.

Thus, there exists a need for an improved technical method, device, and system for identifying a POE of interest outside of a moving vehicle and more intelligently and automatically sub-selecting portions of recorded vehicular video using additional electronic sensor information to inform the technical video sub-selection process.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
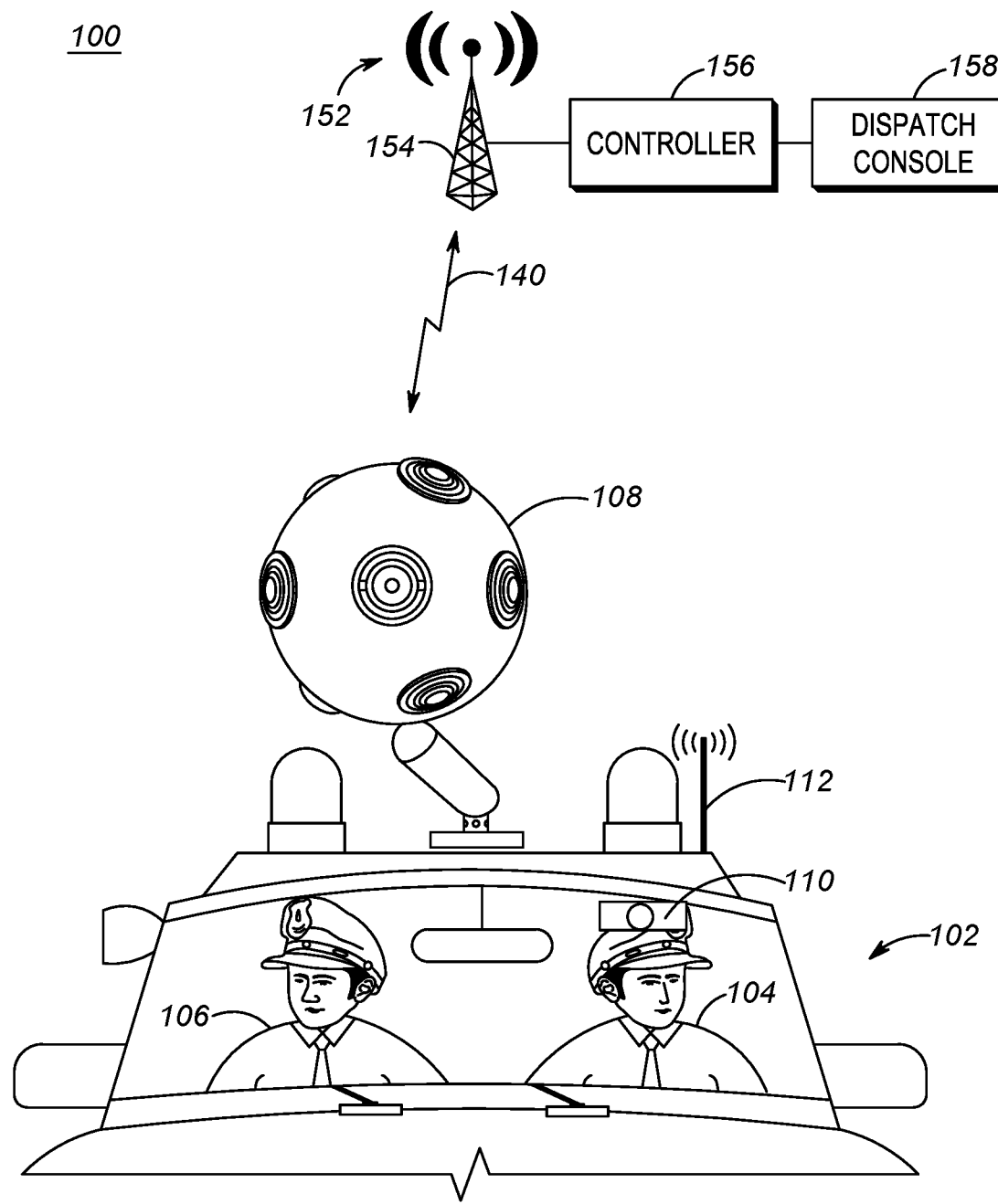
FIG. 1 is a system diagram illustrating an example operating environment for identifying a person, object, or entity (POE) of interest outside of a moving vehicle and more intelligently and automatically sub-selecting portions of recorded vehicular video using additional electronic sensor information to inform the technical video sub-selection process, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved technical method, device, and system for identifying a person, objet, or entity (POE) of interest outside of a moving vehicle and more intelligently and automatically sub-selecting portions of recorded vehicular video using additional electronic sensor information to inform the technical video sub-selection process.

In one embodiment, a method for identifying a person, object, or entity (POE) of interest outside of a moving vehicle includes: receiving, at an electronic processing device from a camera physically coupled to the vehicle, a video stream having a first field-of-view of an area surrounding the vehicle; detecting, by the electronic processing device, a first trigger associated with a vehicle occupant's indicated desire to capture a portion of the video stream; identifying, by the electronic processing device and as a function of the trigger or a separate electronic sensor input, a selected field-of-view sub-portion of the video stream that is less than then an entire captured field-of-view of the video stream; detecting, by the electronic processing device, a second trigger indicative of the vehicle occupant's indicated desire to stop capturing the portion of the video stream; sub-selecting, by the electronic processing device, from the video stream in time based on a timing of the first and second triggers and in field-of-view based on the selected field-of-view sub-portion to create a second modified video stream tailored to a POE of interest indicated by the vehicle occupant; and providing, by the electronic processing device, the second modified video stream to a target device for display, the target device selected from one or more of a vehicular console coupled to the vehicle, a mobile radio computing device associated with the vehicle occupant, a mobile radio computing device associated with another vehicle occupant other than the vehicle occupant, and a dispatch console.

In a further embodiment, an electronic processing device for identifying a person, object, or entity (POE) of interest outside of a moving vehicle includes: a memory; a transceiver; and one or more processors configured to: receive, from a camera physically coupled to the vehicle, a video stream having a first field-of-view of an area surrounding the vehicle; detect a first trigger associated with a vehicle occupant's indicated desire to capture a portion of the video stream; identifying, as a function of the trigger or a separate electronic sensor input, a selected field-of-view sub-portion of the video stream that is less than then an entire captured field-of-view of the video stream; detect, by the electronic processing device, a second trigger indicative of the vehicle occupant's indicated desire to stop capturing the portion of the video stream; sub-select, by the electronic processing device, from the video stream in time based on a timing of the first and second triggers and in field-of-view based on the selected field-of-view sub-portion to create a second modified video stream tailored to a POE of interest indicated by the vehicle occupant; and provide, via the transceiver, the second modified video stream to a target device for display, the target device selected from one or more of a vehicular console coupled to the vehicle, a mobile radio computing device associated with the vehicle occupant, a mobile radio computing device associated with another vehicle occupant other than the vehicle occupant, and a dispatch console.

Each of the above-mentioned embodiments will be discussed in more detail below, starting with an example communication system and a device architecture of an electronic computing device in which the embodiments may be practiced, followed by an illustration of processing steps for achieving an improved method, device, and system for identifying a POE of interest outside of a moving vehicle and more intelligently and automatically sub-selecting portions of recorded vehicular video using additional electronic sensor information to inform the technical video sub-selection process. Further advantages and features consistent with this disclosure will be set forth in the following detailed description, with reference to the figures.

1. COMMUNICATION SYSTEM AND DEVICE ARCHITECTURE

Referring now to the drawings, and in particular FIG. 1, an example communication system diagram illustrates a system 100 including a first mobile vehicle 102 and an example wireless infrastructure radio access network (RAN) 152. The first mobile vehicle 102 is illustrated with two vehicle occupants including a first officer driver 104 and a second officer passenger 106, and is equipped with a vehicular video camera 108 for capturing a field-of-view in an area surrounding the mobile vehicle 102, a driver's head and/or eye-tracking device 110, and an antenna 112 communicatively coupled to a transceiver and vehicular computing device (not shown in FIG. 1) for communicating with other computing devices in an ad-hoc manner or in an infrastructure manner via RAN 152.

The first officer driver 104 is illustrated in FIG. 1 as an officer (e.g. such as a police officer), but in other embodiments, may be any type of vehicle occupant that may wish to identify a POE of interest outside of the mobile vehicle 102 and more intelligently and automatically sub-select portions of recorded vehicular video using additional electronic sensor information to inform the technical video sub-selection process, as disclosed herein. For example, first officer driver 104 may, in other embodiments, work for other governmental and non-governmental agencies such as park districts, real estate offices, or other types of security details. Similar considerations may be applied to the second officer passenger 106. Each of the first officer driver 104 and second officer passenger 106 is also equipped with an associated mobile computing device, which may be carried as a hip radio, as an integrated radio-speaker-microphone (RSM) device, or some other device capable of communicating via short-range and/or long-range wireless communications with the vehicular computing device (not shown), with each other, and/or with controller 156 via RAN 152.

Furthermore, although the remainder of this description focuses on POE identification and vehicular video sub-selection processes with respect to the first officer driver 104, in additional or alternative embodiments, a same or similar separate system may be disposed to allow the second officer passenger 106 to similarly identify POEs of interest outside of the mobile vehicle 102 and more intelligently and automatically sub-selecting portions of recorded vehicular video using additional electronic sensor information to inform the technical video sub-selection process, perhaps simultaneous with the system described herein with respect to the first officer driver 104 and perhaps drawing from a same video feed from a same vehicular video camera 108 or vehicular camera system.

The vehicular video camera 108 may be any imaging device capable of taking still and/or moving-image captures in a corresponding area of interest surrounding a substantial portion of the mobile vehicle 102, illustrated in FIG. 1 as a 360° vehicular video camera 108, but in other embodiments, may include one or more vehicular video cameras having a combined field-of-view of greater than 180°, greater than 260°, or greater than 320°. In an embodiment in which a single vehicular video camera provides the field-of-view, the single vehicular video camera may be a vehicular video camera system including sufficient optical imaging devices to cover the field-of-view noted above, may be a scanning system in which a mechanical system causes a single or reduced count of optical imaging devices to mechanically move at a periodic pace and provide the field-of-view indicated (e.g., such as scanning the field-of-view one or more times per second), or may include one or more pan, tilt, zoom cameras that can be mechanically positioned to provide the field-of-view noted above. In an embodiment in which a plurality of physically separate vehicular video cameras are combined to provide the field-of-view noted above, the plurality of separate vehicular video cameras may be pre-configured or dynamically set (under control of a controller at one of the one or more devices or at the vehicular computing device, for example) to provide substantially non-overlapping or minimally overlapping fields of view that, in totality, provide the field-of-view noted above, and may be combined optically or digitally at the vehicular computing device noted above or at one or more of the plurality of separate vehicular video cameras, among other possibilities.

The vehicular video camera 108 may be continuously on, may periodically take video and/or images at a regular cadence, or may be trigged to begin capturing images and/or video as a result of some other trigger, as will be discussed in more detail below. The vehicular video camera 108 may include underlying CMOS or CCD imager(s), for example, for digitally capturing images and/or video of a corresponding area of interest surrounding the mobile vehicle 102.

Images and/or video captured at the vehicular video camera 108 may be stored at the vehicular video camera 108 itself, and/or may be transmitted to a separate storage or processing device via a wired connection with the vehicular computing device, to other devices such as officer-equipped mobile computing devices via a direct-mode wireless link and/or via infrastructure RAN 152, or to other infrastructure computing devices via infrastructure RAN 152. While vehicular video camera 108 is illustrated in FIG. 1 as affixed to a top of the mobile vehicle 102, in other embodiments, the vehicular video camera 108 may be affixed to another location on the mobile vehicle 102, or multiple other locations on the mobile vehicle 102.

Figure 3:
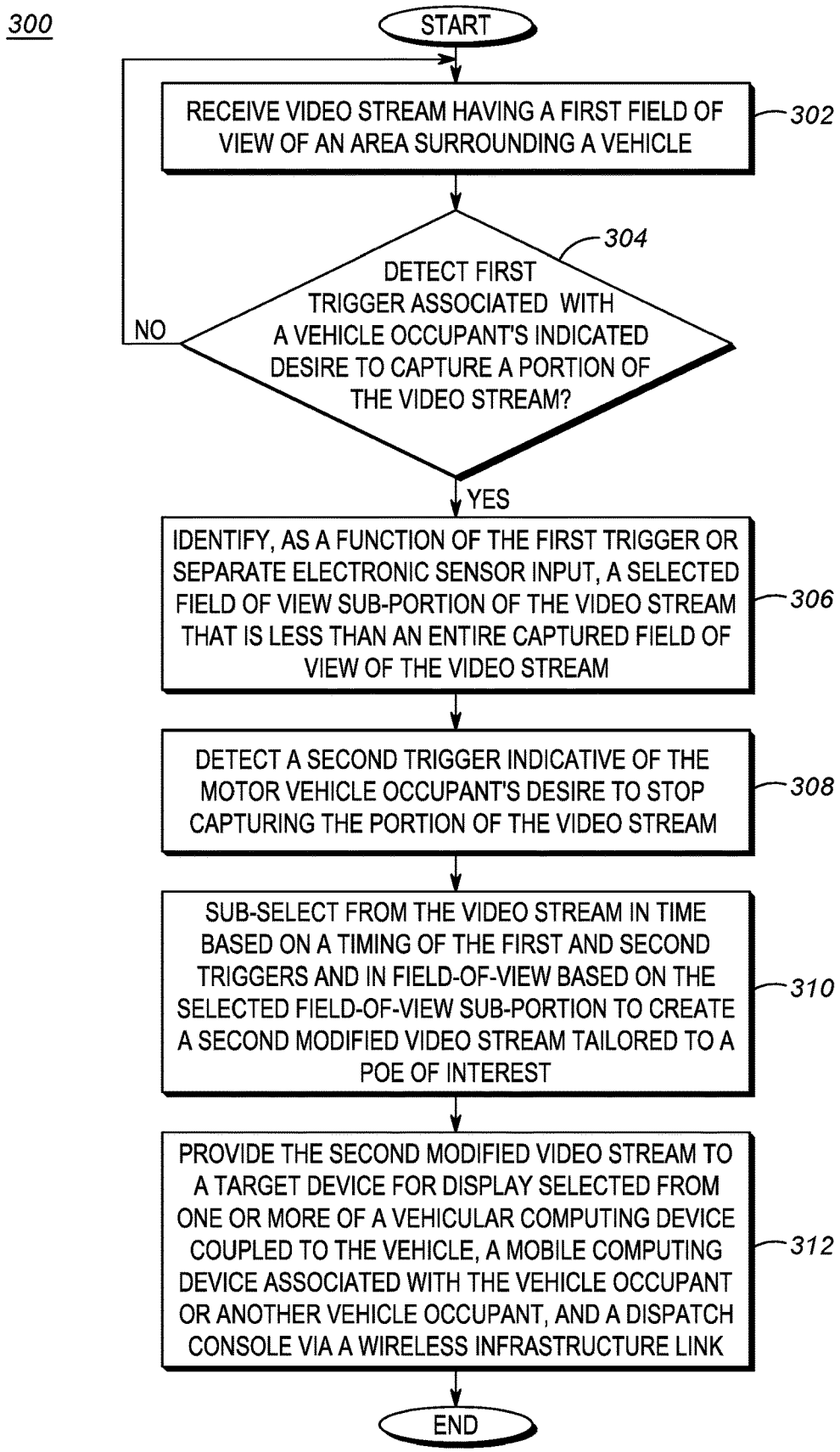
FIG. 3 illustrates a flow chart setting forth process steps for operating an electronic computing device for identifying a POE of interest outside of a moving vehicle and more intelligently and automatically sub-selecting portions of recorded vehicular video using additional electronic sensor information to inform the technical video sub-selection process, in accordance with an embodiment.

The driver's head and/or eye-tracking device 110 may be any optical and/or mechanical system for identifying and determining a direction of intent of the first officer driver 104 with respect to one or both of a first video recording trigger and a second video recording trigger and for providing head and/or gaze direction information in one or more electronic messages to another computing device for further processing, such as the vehicular computing device, the one or more mobile computing devices associated with the first officer driver 104 and/or second officer passenger 106, and/or the controller 156 via RAN 152, among other possibilities and as will be discussed in more detail with respect to FIG. 3. For example, and as illustrated in FIG. 1, the driver's head and/or eye-tracking device 110 may be a rear-facing (in relation to the rear of the car) optical recording device that is capable of tracking a location of the driver's head and/or eye gaze and determining, based on the optical tracking, a direction in which the first officer driver 104 is looking (where 0° is directly forward and labeled east in the figure and where 90° is tangentially to the first officer driver's 104 left and labeled north in the figure). For example, the rear-facing camera may optically track the first officer driver's 104 gaze using infrared light reflections to track movements in a center of the pupil, front of the cornea, and/or back of the lens, or by tracking movements in detected retinal blood vessels. In other embodiments, the rear-facing camera may use face-detection on captured 2D images to detect a direction in which the first officer driver's 104 face is directed. Still further, a depth camera may be use face detection on captured 3D depth images to detect a direction in which the first officer driver's 104 face is directed. Other possibilities for optical tracking exist as well.

In other embodiments, the driver's head and/or eye-tracking device 110 may be an electro-mechanical system may be physically coupled to the first officer driver's 104 head and may electro-mechanically detect the first officer's 104 head direction and transmit physical direction information in a manner similar to the foregoing. For example, a physical arm attached to the first officer driver's 104 head may track the head's motion and electronically communicate it to another computing device in accordance with the foregoing. Still further, an electromagnetic system may be disposed to detect changes in magnetic fields as the first officer driver 104 moves his or her head, and may similarly electronically communicate the detected head position to another computing device in accordance with the foregoing. Other possibilities for electro-mechanical tracking exist as well. And still other methods of tracking a vehicle occupant's head and/or gaze direction are possible as well.

Infrastructure RAN 152 may implement over wireless link(s) 140 a conventional or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, infrastructure RAN 152 may additionally or alternatively implement over wireless link(s) 140 a Long Term Evolution (LTE) protocol including multimedia broadcast multicast services (MBMS), an open mobile alliance (OMA) push to talk (PTT) over cellular (OMA-PoC) standard, a voice over IP (VoIP) standard, or a PTT over IP (PoIP) standard. In still further embodiments, infrastructure RAN 152 may additionally or alternatively implement over wireless link(s) 140 a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of wireless protocols could be implemented as well. The infrastructure RAN 152 is illustrated in FIG. 1 as providing coverage for the mobile vehicle 102 and its occupants via a single fixed terminal 154 coupled to a controller 156 (e.g., radio controller, call controller, PTT server, zone controller, MME, BSC, MSC, site controller, Push-to-Talk controller, or other network device) and including a dispatch console 158 operated by a dispatcher. In other embodiments, more or different types of fixed terminals may provide RAN services to the mobile vehicle 102 and its vehicle occupants and may or may not contain a separate controller 156 and/or dispatch console 158.

Figure 2:
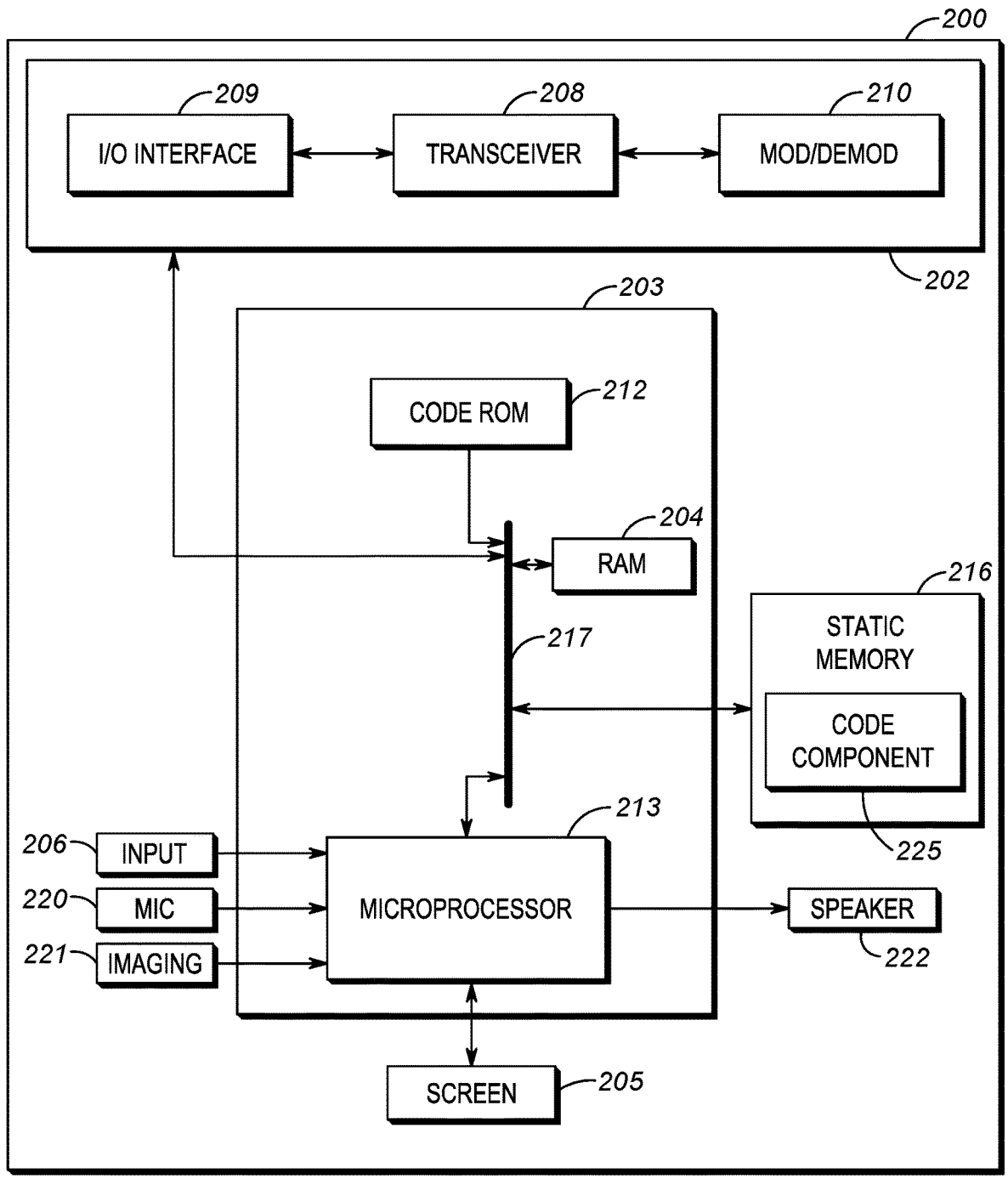
FIG. 2 is a device diagram showing a device structure of an electronic computing device for identifying a POE of interest outside of a moving vehicle and more intelligently and automatically sub-selecting portions of recorded vehicular video using additional electronic sensor information to inform the technical video sub-selection process, in accordance with an embodiment.

Now referring to FIG. 2, a schematic diagram illustrates an electronic computing device 200 according to some embodiments of the present disclosure. Electronic computing device 200 may be, for example, embedded in vehicular video camera 108 (or distributed across two or more vehicular video cameras, in some instances), in a vehicular computing device integrated with mobile vehicle 102, in a mobile computing device of a vehicle occupant (such as first officer driver 104 and/or second officer passenger 106 of FIG. 1), at a remote server device in the RAN 152 (such as at controller 156), or at a remote server at some other location in a network accessible via RAN 152, or may be distributed across one or more of the foregoing. As shown in FIG. 2, computing device 200 includes a communications unit 202 coupled to a common data and address bus 217 of a processing unit 203. In some embodiments, the computing device 200 may also include an input unit (e.g., keypad, pointing device, touch-sensitive surface, etc.) 206 and a display screen 205, each coupled to be in communication with the processing unit 203.

A microphone 220 may be present for capturing audio that is further encoded by processing unit 203 and transmitted as an audio stream by communication unit 202 to other devices. A communications speaker 222 may be present for reproducing audio that is sent to the computing device 200 via the communication unit 202, or may be used to play back alert tones or other types of pre-recorded audio when an automatically sub-selected portion of recorded vehicular video is received for review by a user of the electronic computing device 200.

The processing unit 203 may include a code Read Only Memory (ROM) 212 coupled to the common data and address bus 217 for storing data for initializing system components. The processing unit 203 may further include a microprocessor 213 coupled, by the common data and address bus 217, to a Random Access Memory (RAM) 204 and a static memory 216.

The communications unit 202 may include one or more wired or wireless input/output (I/O) interfaces 209 that are configurable to communicate with other devices, such as a portable radio, tablet, wireless RAN, and/or vehicular transceiver.

The communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or other similar type of wireless transceiver configurable to communicate via a wireless radio network. The communications unit 202 may additionally or alternatively include one or more wireline transceivers 208, such as an Ethernet transceiver, a Universal Serial Bus (USB) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The microprocessor 213 has ports for coupling to the input unit 206 and the microphone unit 220, and to the display screen 205 and speaker 222. Static memory 216 may store operating code 225 for the microprocessor 213 that, when executed, performs one or more of the computing device steps set forth in FIG. 3 and accompanying text.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

2. PROCESSES FOR IDENTIFYING A POE OF INTEREST OUTSIDE OF A MOVING VEHICLE AND INTELLIGENTLY AND AUTOMATICALLY SUB-SELECTING PORTIONS OF RECORDED VEHICULAR VIDEO USING ADDITIONAL ELECTRONIC SENSOR INFORMATION

Figure 4:
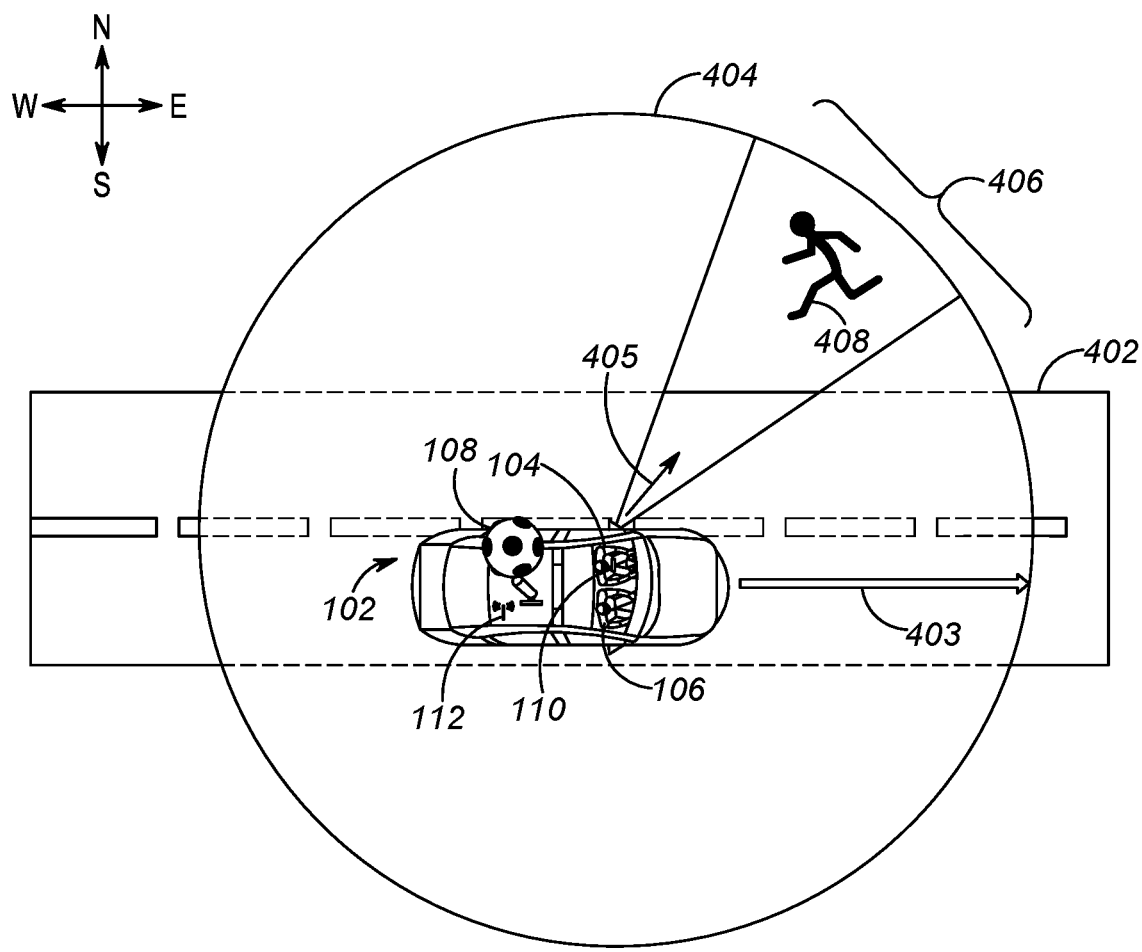
FIG. 4 is a plan view illustrating an initial identification of a particular field-of-view and time frame to sub-select portions of a vehicular video stream, in accordance with an embodiment.
Figure 5:
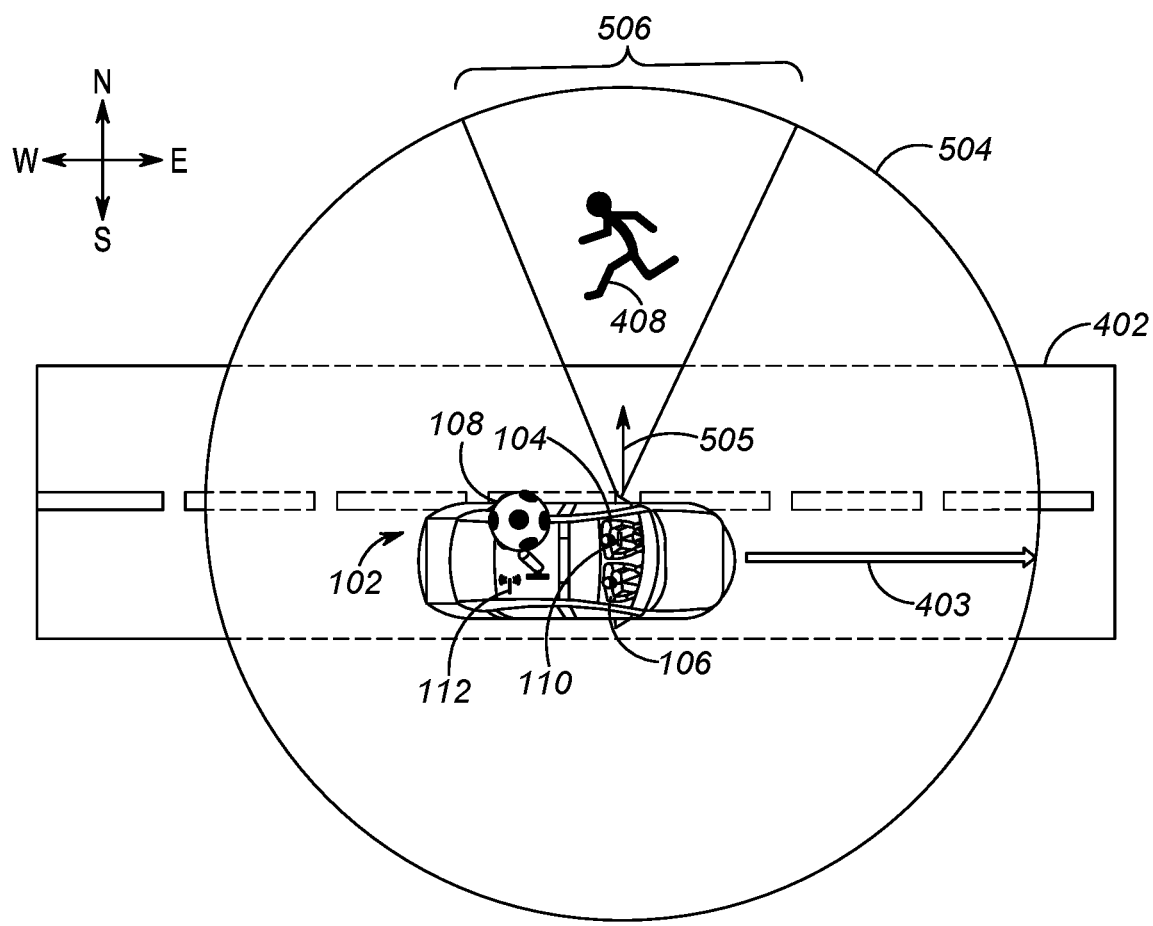
FIG. 5 is a plan view illustrating a continued identification of a particular field-of-view and time frame to sub-select portions of a vehicular video stream, in accordance with an embodiment.
Figure 6:
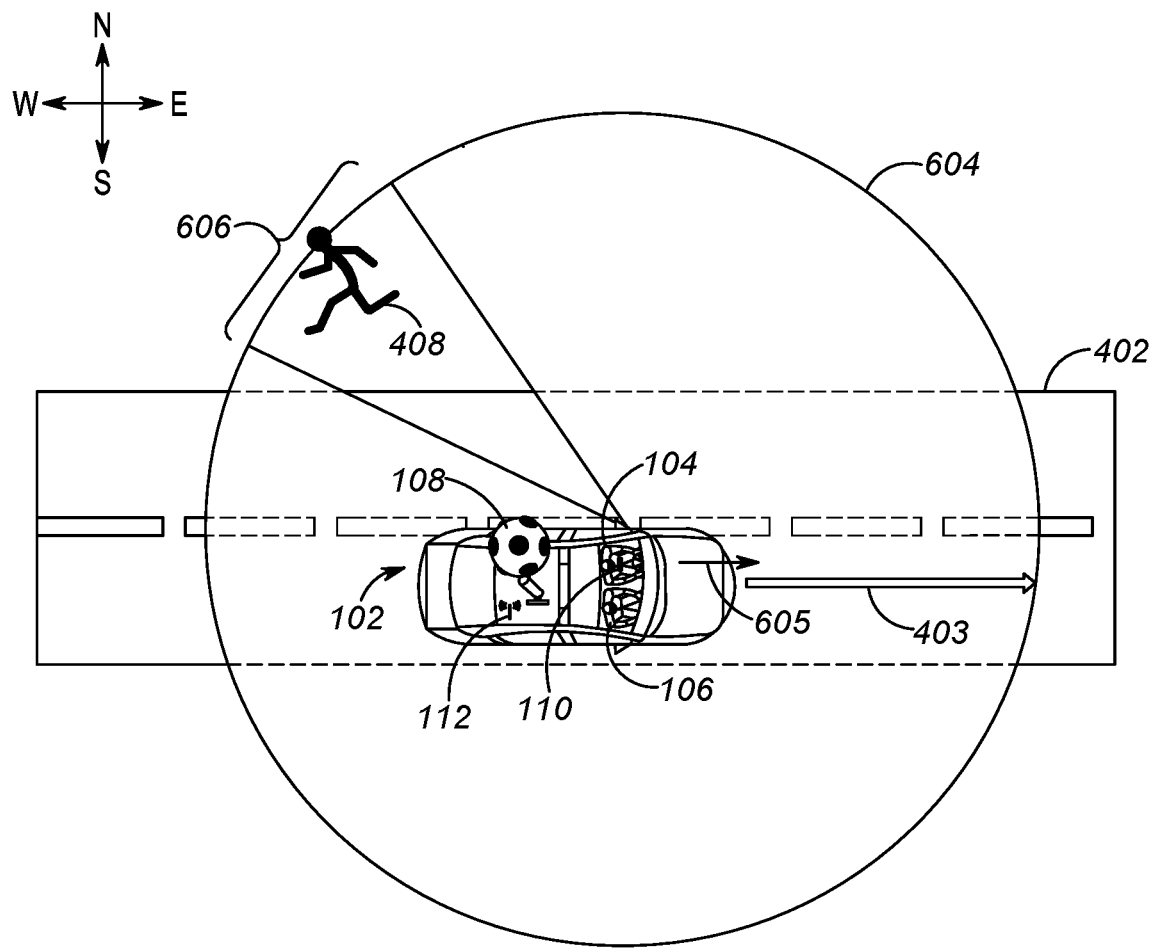
FIG. 6 is a plan view illustrating an example final identification of a particular field-of-view and time frame to sub-select portions of a vehicular video stream after a second trigger has been detected, in accordance with an embodiment.

Turning now to FIGS. 3-6, a flow chart diagram in FIG. 3 illustrates a process 300 for identifying a POE of interest outside of a moving vehicle and more intelligently and automatically sub-selecting portions of recorded vehicular video using additional electronic sensor information. FIGS. 4-6 set forth plan views illustrating various steps of process 300 in a example scenarios. While a particular order of processing steps, message receptions, and/or message transmissions is indicated in FIG. 3 for exemplary purposes, timing and ordering of such steps, receptions, and transmissions may vary where appropriate without negating the purpose and advantages of the examples set forth in detail throughout the remainder of this disclosure. A corresponding electronic computing device, such as that set forth in FIG. 2 above and embodied as a singular electronic computing device or distributed electronic computing device as set forth earlier, may execute process 300.

Method 300 begins at step 302 where the electronic computing device communicatively coupled to a vehicular video camera (or system of vehicular video cameras, hereinafter "vehicular video camera") receives a video stream from the vehicular video camera having a first field-of-view of an area surrounding the mobile vehicle 102. For example, and with reference to FIG. 4, a mobile vehicle 102 may be travelling down a roadway 402 in a particular direction 403. The mobile vehicle 102 of FIG. 4 may be the same as the mobile vehicle 102 of FIG. 1, and its description is incorporated by reference with respect to FIG. 4. The vehicular video camera 108 may be a 360° camera having a field-of-view 404 entirely surrounding the mobile vehicle 102 in all directions. Accordingly, the electronic computing device at step 302 may receive a video stream from the vehicular video camera 108 having the 360° field-of-view 404. The electronic computing device may permanently store the entire video stream received at step 302 (e.g., the entire field-of-view), may temporarily store the video stream for some period of time (e.g., a buffer time of 1-60 seconds) until it is permanently stored, deleted, or replaced with newer video stream data (depending on other logic), or may not store any of the video stream until some further trigger condition is detected.

At step 304, the electronic computing device determines whether a first trigger associated with a vehicle occupant's indicated desire to capture a portion of the video stream has been detected. The first trigger may be, for example, an audio instruction, detected via a microphone input communicatively coupled to the electronic computing device, indicative of a vehicle occupant's indicated desire to capture the portion of the video stream. The microphone may be a vehicular microphone sensitive enough to detect an instruction of a vehicle occupant to start the capturing, or may be a microphone integrated into some other mobile computing device such as a radio speaker microphone (RSM), mobile computing device, or headset physically disposed on a vehicle occupant, may be a microphone physically disposed in a portable vehicular radio, or may be some other microphone configured to detect such audio and responsively generate and/or transmit a corresponding electronic communication to the electronic computing device indicative of such. The audio instruction may be, for example, "start recording," "capture that," or "record that," among other possibilities.

Alternatively, the first trigger may be detection of a manual activation of a switch or button indicative of the vehicle occupant's indicated desire to capture the portion of the video stream. For example, the switch or button may be a dedicated or soft-assigned switch or button (physically or touch-activated) on a vehicular console, portable vehicular radio, RSM or mobile computing device associated with and disposed on one of the vehicle occupants, or some other button or switch input configured to detect such activation and responsively generate and/or transmit a corresponding electronic communication to the electronic computing device indicative of such. As one specific example, the button may be disposed on a steering wheel or steering column of the mobile vehicle and communicably coupled to the electronic computing device.

In some embodiments, the first trigger may instead be a tracked eye-gaze direction of a vehicle occupant indicative of the vehicle occupant's indicated desire to capture the portion of the video stream. For example, a separate pair of eyeglasses or goggles, or a vehicular-disposed eye-gaze tracker such as the driver's head and/or eye-tracking device 110 of FIG. 1, may track an eye-gaze of the driver and when the eye-gaze is sent to a pre-determined area associated with an instruction to capture the portion of the video stream, may generate and/or transmit a corresponding instruction to the electronic computing device.

In still further embodiments, multiple eye-gaze or head-direction trackers may be disposed on or near vehicle occupants to detect an eye-gaze and/or head direction of the multiple vehicle occupants and, after a detected threshold number of two or more vehicle occupants are detected as having a detected eye-gaze or head-direction facing in a same direction (e.g., +−5-10°) that is other than in a direction of travel of the mobile vehicle, may generate and/or transmit a corresponding instruction to the electronic computing device to capture the portion of the video stream. For example, a vehicle may include the driver's head and/or eye-tracking device 110 of FIG. 1 and a similar device tracking a passenger's head and/or eye direction. Both devices may transmit head and/or eye direction information to the electronic computing device so as to enable the electronic computing device to make the determination of whether the threshold number is met, or both devices may communicate with one another or some other central controller to make the threshold determination and then transmit an indication of the determination to the electronic computing device. In some embodiments, the threshold number may be all vehicle occupants, may be two vehicle occupants, or may be three or more vehicle occupants, or some combination thereof.

Assuming no first trigger is detected at step 304, processing proceeds back to step 302 where additional video stream data is received at the electronic computing device. On the other hand, if a first trigger is detected at step 304, processing proceeds to step 306.

At step 306, and in response to detecting the first trigger at step 304, the electronic computing device identifies, as a function of the first trigger or a separate electronic sensor input, a selected field-of-view sub-portion of the video stream that is less than an entire captured field-of-view of the video stream from the vehicular camera.

If the first trigger was detected based on some head or eye-gaze direction of one or more vehicle occupants of the vehicle, that same first trigger information may be re-used at step 306 to identify a selected field-of-view sub-portion of the video stream. For example, if the threshold number of vehicle occupants were detected as turning their heads to a same direction at step 304, the electronic computing device may use such direction information (assuming it was also provided to the electronic computing device, perhaps in addition to an indication to start capturing the portion of the video stream at step 304, or assuming it was the indication to start capturing the portion of the video stream at step 304) to identify the field-of-view sub-portion. With reference to FIG. 4, if the threshold number of vehicle occupants were all detected to turn their heads to the direction 405 (which is not the direction of travel of the vehicle 102) to view a POE 408 of interest (e.g., illustrated as a person in FIG. 4), the electronic computing device may use the head-direction information (indicated as direction 405 in FIG. 4) in determining a field-of-view sub-portion of the video stream. Although a person of interest is illustrated in FIG. 4 as the POE 408 of interest, in other embodiments, the POE of interest may be another parked vehicle, a particular place of business, a particular sign, a particular worrisome object (flammable or biological), and/or other types objects of interest.

A pre-determined sub-field-of-view window value may be set at the electronic computing device and applied by the electronic computing device to determine how wide of a field-of-view to select once the particular direction of the POE is identified. For example, and assuming the direction 403 of FIG. 4 points at 0° and increasing angle measurements increase in a counter-clockwise manner until the direction reaches direction 403 again at 360°, direction 405 may be determined to point in a direction of approximately 45°. The pre-determined sub-field-of-view window value may then determine how far in each clockwise and counter-clockwise direction to increase the field-of-view to get a video "buffer" region in space around the direction 405. The pre-determined sub-field-of-view window value may be, for example, 30° such that, when applied to the direction 405 at 45°, sets the selected field-of-view sub-portion to be 15-75°. Other pre-determined sub-field-of-view window values may be used as well, as long as they result in less than the total field-of-view of the video stream provided by the vehicular camera. In some embodiments, the pre-determined sub-field-of-view window value is between 20-40°, inclusive, in other embodiments the pre-determined sub-field-of-view window value is between 40-60°, inclusive, and in still other embodiments, the pre-determined sub-field-of-view window value is between 60-80°, inclusive.

In embodiments where the first trigger was a detected audio command or button or switch activation, additional information may be needed to identify the selected field-of-view sub-portion beyond the first trigger itself. In the case of a detected audio command, additional audio may be further detected as secondary sensor information to aid the electronic computing device in identifying the selected field-of-view sub-portion. For example, the audio command detected at step 304 as the first trigger ("record that," or "capture that") may be followed by additional audio that may identify a particular direction of view, such as "10 o'clock" or "northeast". The additional audio may be captured at a corresponding microphone and provided to the electronic computing device directly for further use and interpretation, or may be packaged into separate commands or instructions by an intervening computing device that directs the electronic computing device to set the selected field-of-view sub-portion based on the additional audio. The additional audio may be interpreted relative to a direction of travel of the vehicle 102, such that additional audio instructions "9 o'clock" or "northwest" would roughly identify a direction similar to the direction 405 relative to the direction 403 of travel of the vehicle in FIG. 4, or may be interpreted as an absolute instruction relative to true north, such that additional audio instructions "2 o'clock" or "northeast" would roughly identify a direction similar to the direction 405 in FIG. 4.

As an alternative for requiring additional audio, and in other embodiments, an optical sensor may detect a pointing direction of one of the vehicle occupants, or the electronic computing device may detect activation of a vehicular field-of-view selector input of a vehicular console application that may divide the mobile vehicle 102 into four or more quadrants, and rely upon a vehicle occupant to manually select one of the quadrants to identify the selected field-of-view sub-portion. Other relative or absolute manners of identifying a desired field-of-view are possible as well.

In some embodiments, only an initial selected field-of-view sub-portion is identified at step 306 and it does not change throughout the remainder of time until a second trigger is subsequently detected at step 308. In other embodiments, the selected field-of-view sub-portion is updated over time and is synced with the captured video stream such that while the size of the pre-determined sub-field-of-view window value may not change over time, its center position within the overall field-of-view of the video stream is made to vary. The selected field-of-view sub-portion center portion may be updated and varied based on one or more of (i) continued updated audio instructions that update locations of the POE such as "now 9 o'clock" or "now 8 o'clock", (ii) continued head or eye-gaze tracking that track further shifts in head or eye-gaze of one or more vehicle occupants, and (iii) a detected speed of the mobile vehicle. FIG. 5 illustrates an example in which the direction 505 to the POE 408 of interest has shifted from the direction 405 of FIG. 4 such that while a center location of the selected field-of-view sub-portion 506 has changed, a size of the selected field-of-view sub-portion 506 has not changed relative to the selected field-of-view sub-portion 406 of FIG. 4. The electronic computing device may thus shift the center location of the selected field-of-view sub-portion for any of the reasons noted above, and operate to keep a POE 408 of interest within the selected field-of-view sub-portion despite continued motion of the mobile vehicle 102 and/or POE 408 of interest.

At step 308, the electronic computing device detects a second trigger indicative of the vehicle occupant's indicated desire to stop capturing the portion of the video stream.

The second trigger may be, for example, an audio instruction, detected via a microphone input communicatively coupled to the electronic processing device, indicative of the vehicle occupant's indicated desire to stop capturing the portion of the video stream. The microphone may be a same or similar one as already described with respect to step 304 above. The audio instruction may be, for example, "stop recording," "stop that," or "that's enough," among other possibilities.

Alternatively, the second trigger may be detection of a manual de-activation of a switch or button indicative of the vehicle occupant's indicated desire to capture the portion of the video stream, or detection of a manual activation of a separate switch or button indicative of the vehicle occupant's indicated desire to stop capturing the portion of the video stream. For example, the switch or button may be a dedicated or soft-assigned switch or button (physically or touch-activated) on a vehicular console, portable vehicular radio, RSM or mobile computing device associated with and disposed on one of the vehicle occupants, or some other button or switch input configured to detect such activation or de-activation and responsively generate and/or transmit a corresponding electronic communication to the electronic computing device indicative of such.

In some embodiments, the second trigger may instead be a tracked eye-gaze direction of the vehicle occupant indicative of the vehicle occupant's indicated desire to stop capturing the portion of the video stream. For example, a separate pair of eyeglasses or goggles, or a vehicular-disposed eye-gaze tracker such as the driver's head and/or eye-tracking device 110 of FIG. 1, may track an eye-gaze of the driver and when the eye-gaze is sent to a pre-determined area associated with an instruction to stop capturing the portion of the video stream, a corresponding instruction may be generated at or received by the electronic computing device.

In still further embodiments, multiple eye-gaze or head-direction trackers may be disposed on or adjacent vehicle occupants to detect an eye-gaze and/or head direction of multiple vehicle occupants and, after a detected threshold number of two or more vehicle occupants are detected as having a detected eye-gaze or head-direction returning to the vehicle-travel direction from the non-vehicle-travel direction, may generate and/or transmit a corresponding instruction to the electronic computing device. In some embodiments, the threshold number may be all vehicle occupants, may be two vehicle occupants, or may be three or more vehicle occupants, or some combination thereof.

At step 310, the electronic computing device sub-selects from the video stream in time based on a timing of the first and second triggers and in field-of-view based on the selected field-of-view sub-portion, to create a second modified video stream tailored to a POE of interest in the area surrounding the mobile vehicle.

The electronic computing device sub-selects from the video stream in time based on a timing of the first and second triggers. For example, the electronic computing device may record a time at which the first trigger was detected and a time at which the second trigger was detected, and use those recorded times to sub-select a portion of the video stream, in time, relative to the recorded times. The video stream may then be sub-selected in time in a number of different ways. In a first example, the video stream may be embedded with periodic time stamps such that the electronic computing device may extract, from the video stream, only those portions of the video stream, in time, matching the recorded times associated with the first and second triggers. In a second example, the electronic computing device may insert or embed a tag in the video stream at a time when the first and second triggers are detected, such that the electronic computing device may extract, from the video stream, only those portions of the video stream, in time, by subsequently detecting the tags inserted or embedded in the video stream. Other methods of sub-selecting in time are possible as well. The time at which the first trigger was detected may be used directly to set an initial time for sub-selecting from the video stream in time. In some embodiments, the time at which the second trigger was detected may similarly be directly used as a final time for sub-selecting from the video stream in time. In other embodiments, however, an elongated or extended time beyond an exact time at which the second trigger was detected may be used as the final time for sub-selecting from the video stream in time. An example of this is illustrated in FIG. 6, in which a first officer driver's 104 head direction 605 is substantially returned to the same direction 403 of travel of the vehicle 102, however, the vehicular video camera 108 continues to record and provide a video stream, and the electronic computing device can continue to track the POE 408 of interest in a field-of-view 606 out of the entire field-of-view 604 of the camera as the mobile vehicle 102 continues on its way (again, perhaps adjusted based on a detected speed of the mobile vehicle 102 or using some form of POE object detection algorithm). The amount of time to extend sub-selection of the video stream beyond the time of the detection of the second trigger may be configured at the electronic computing device, and may vary from 1 to 30 seconds, perhaps depending upon a type of POE detected, an incident in which the first officer driver 104 or mobile vehicle 102 is currently associated, a speed of the mobile vehicle 102, and/or some other parameter. Accordingly, in this latter example and in some embodiments, the sub-selection in time may extend some fixed length beyond the detection of the second trigger.

The electronic computing device also sub-selects from the video stream in field-of-view based on the selected field-of-view sub-portion of the video stream identified at step 306 (and perhaps as subsequently adjusted in center position but not size over time, as noted earlier). The vehicular camera may encode field-of-view information within the video stream itself, or may provide configured field-of-view information to the electronic computing device that identifies portions of the provided video stream corresponding to particular captured fields of view.

The manner of extracting a limited field-of-view from a broader field-of-view included in the video stream may vary depending upon the underlying media encoding method of the video stream. For media formats that fully encode all image data for each frame, sub-selecting the limited field-of-view may simply involve extracting those quadrants of the video stream corresponding to the more limited field-of view using the field-of-view information set forth above. For media formats that encode only changes in image data between key frames, sub-selecting the limited field-of-view may involve extracting those quadrants of the key frames corresponding to the extracted and limited fields-of-view, and re-encoding changes between the extracted key frame portions into a new encoded video stream using the field-of-view information set forth above. Other methods of sub-selecting in field-of-view are possible as well.

In sub-selecting from the video stream in time and field-of-view, a second correspondingly modified video stream is created that effectively tailors the video stream from the vehicular camera to the POE of interest as a function of the first and second triggers, and additional electronic sensor information in accordance with the foregoing.

At step 312, the electronic computing device provides the second modified video stream to a target device for display, the target device selected from one or more of a vehicular console coupled to the mobile vehicle, a mobile computing device associated with the vehicle occupant or another vehicular occupant, and a dispatch console via a wireless infrastructure link. The electronic computing device may be pre-configured to select one or more target devices for display from the above list, may be configured to dynamically select one or more target devices for display from the above list based on other context such as a type of POE identified in the sub-selected field-of-view, a type of incident with which the vehicle or vehicle occupant is associated, a time of day, and a day of week, and/or may be configured to dynamically select one or more target devices for display based on an instruction received from a vehicle occupant identifying the one or more target devices. The instruction received from a vehicle occupant may be an electronic interface selection identifying the one or more target devices, may be a detected audio command identifying the one or more target devices, or may be some other type of input instruction detected by the electronic computing device. The second modified video stream may be wiredly and/or wirelessly transmitted to the one or more target devices identified above via one or more electronic transmissions via an ad-hoc and/or infrastructure wired or wireless network. In some embodiments, the entire second modified video stream may be transmitted to the one or more target devices, while in other embodiments, merely an actionable link to the second modified stream may be transmitted to the one or more target devices. Activating the actionable link may then cause the second modified video stream to be live-streamed and/or downloaded by the receiving target devices.

The electronic computing device may also further assist a user of a target device receiving the second modified video stream in quickly identifying the POE of interest in the second modified video stream by identifying a central frame (in time, e.g., within +−10% or +−20% of the exact center frame of the second modified video stream relative to an entire running time of the second modified video stream) in the second modified video stream having a minimum level of blur. Once the central frame with a minimum level of blur is identified, the central frame could be provided to the one or more target devices prior to the remainder of the second modified video stream for initial display, or, in other embodiments, the identity of the central frame could be provided to the one or more targets accompanying the second modified video stream so that the receiving one or more target devices may identity a frame in the second modified video stream to initially render (instead of a first frame in the second modified video stream). Other possibilities for identifying and communicating the central frame exist as well.

Additionally or alternatively, the electronic computing device may provide the second modified video stream to an initial one of the one or more target devices noted above, and receive in return, from a user of the initial one of the one or more target devices, an indication of a frame in the second video stream best illustrating the POE of interest. Further in response to such reception, the electronic computing device may provide the indicated frame to one or more other target devices selected from the one or more target devices noted above, perhaps further accompanying a copy of the second modified video stream. This allows, for example, the first officer driver who perhaps initiated the recording and sub-selecting of the video stream to receive an initial copy of the second modified video stream and quickly identify the POE of interest from the time and field-of-view sub-sampled second video stream. The frame best illustrating the POE of interest is then selected by the first officer driver and provided back to the electronic computing device for further distribution to other interested parties, such as a dispatcher via the dispatch console ad/or other officers via their respective mobile computing devices.

In a further example, the electronic computing device may provide the second modified video stream to an initial one of the one or more target devices noted above, and receive in return, from a user of the initial one of the one or more target devices, not only an indication of a frame in the second video stream best illustrating the POE of interest but also an indication of what the POE of interest is in the frame. In response, the electronic computing device may modify the frame to further highlight the POE of interest (via a change in color, brightness, or contrast for example) and then provide the indicated and modified frame to one or more other target devices selected from the one or more target devices noted above, perhaps further accompanying a copy of the second modified video stream. This allows, for example, the first officer driver who perhaps initiated the recording and sub-selecting of the video stream to receive an initial copy of the second modified video stream and quickly identify the POE of interest from the time and field-of-view sub-sampled second video stream. The frame best illustrating the POE of interest is then selected by the first officer driver and the POE of interest itself also identified in the frame (e.g., perhaps by the first officer driver using a touch input to circle the POE of interest within the displayed frame) and then provided back to the electronic computing device for further distribution to other interested parties, such as a dispatcher via the dispatch console ad/or other officers via their respective mobile computing devices.

In a still further example, and in instances where the POE of interest may be a person, the electronic computing device may apply a face-recognition algorithm having access to a database of known faces to the second modified video stream and identify a frame within the second modified video stream in which the face-recognition algorithm provides a highest confidence hit with a known person from the facial recognition database. The frame providing the highest confidence face-recognition hit may then be provided to one or more target devices in a manner already set forth above. This allows, for example, the first officer driver who perhaps initiated the recording and sub-selecting of the video stream to further receive an initial copy of the second modified video stream and further receive potential facial recognition hits identifying potential suspects or other persons potentially matching the face identified as the POE of interest in the time and field-of-view sub-sampled second video stream. The first officer driver can then confirm or disconfirm the identity provided by the face-recognition algorithm, and such confirmation or disconfirmation received at the electronic computing device and further distributed to other interested parties, such as a dispatcher via the dispatch console ad/or other officers via their respective mobile computing devices.

In a final example, and in instances where the POE of interest may be an object, the electronic computing device may apply an object-recognition algorithm having access to a database of known objects to the second modified video stream and identify a frame within the second modified video stream in which the object-recognition algorithm provides a highest confidence hit with a known object from the object recognition database. The frame providing the highest confidence object-recognition hit may then be provided to one or more target devices in a manner already set forth above. This allows, for example, the first officer driver who perhaps initiated the recording and sub-selecting of the video stream to receive an initial copy of the second modified video stream and receive potential object recognition hits identifying objects matching the object identified as the POE of interest in the time and field-of-view sub-sampled second video stream. The first officer driver can then confirm or disconfirm the object identity, and such confirmation or disconfirmation received at the electronic computing device and may be further distributed to other interested parties, such as a dispatcher via the dispatch console ad/or other officers via their respective mobile computing devices.

3. CONCLUSION

In accordance with the foregoing, an improved device, method, and system is disclosed for identifying a POE of interest outside of a moving vehicle and more intelligently and automatically sub-selecting portions of recorded vehicular video using additional electronic sensor information to inform the technical video sub-selection process. As a result of the foregoing, vehicular occupants and related officers and dispatchers can more quickly and accurately receive indications of POEs of interest identified by a vehicular occupant and more quickly and accurately respond to situations involving such POEs of interest. Furthermore, vehicular occupants are presented with only the information relevant to their inquiry, and can further modify the information and distribute the information for further action more quickly and accurately, reducing false positives and false negatives, reducing processing loads on computing devices, and enabling additional technical features previously not possible under similar circumstances.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for identifying a person, object, or entity (POE) of interest outside of a moving vehicle and of interest to a vehicle occupant and sub-selecting a video stream from a vehicular camera in corresponding time and field-of-view, the method comprising:

receiving, at an electronic processing device from a vehicular camera physically coupled to the vehicle, a video stream having a first field-of-view of an area surrounding the vehicle;

detecting, by the electronic processing device, a first trigger associated with a vehicle occupant's indicated desire to start capture of a vehicle occupant desired field-of-view sub-portion of the video stream that is less than an entire captured field-of-view of the video stream, the first trigger comprising one of a detected communication from a vehicle occupant head or eye-tracking device, an audio signal from the vehicle occupant detected via a microphone, and an electronic communication generated via activation of a switch or button indicative of the vehicle occupant's desire to start capture of the vehicle occupant desired field-of-view sub-portion of the video stream;

identifying, by the electronic processing device, the vehicle occupant desired field-of-view sub-portion of the video stream as a function of one of (i) head direction information from the vehicle occupant head-tracking device identifying a direction in which the vehicle occupant's head is facing in the areas surrounding the vehicle such that the vehicle occupant desired field-of-view sub-portion of the video stream includes areas surrounding the vehicle matching the direction in which the vehicle occupant's head is facing (ii) eye gaze direction information from the vehicle occupant eye-tracking device identifying a direction in which the vehicle occupant's eyes are directed in the areas surrounding the vehicle such that the vehicle occupant desired field-of-view sub-portion of the video stream includes areas surrounding the vehicle matching the direction in which the vehicle occupant's eyes are directed, (iii) a second audio signal from the vehicle occupant identifying a current viewing direction of the vehicle occupant in the areas surrounding the vehicle such that the vehicle occupant desired field-of-view sub-portion of the video stream includes areas surrounding the vehicle matching the current viewing direction identified in the second audio signal, (iv) an optical signal identifying a pointing direction that the vehicle occupant's finger is pointing in the areas surrounding the vehicle such that the vehicle occupant desired field-of-view sub-portion of the video stream includes areas surrounding the vehicle matching the pointing direction in which the vehicle occupant's finger is pointed, and (v) user input from the vehicle occupant selecting one of a plurality of vehicle quadrants in the areas surrounding the vehicle such that the vehicle occupant desired field-of-view sub-portion of the video stream includes areas surrounding the vehicle matching the selected vehicular quadrant;

detecting, by the electronic processing device, a second trigger indicative of the vehicle occupant's indicated desire to stop capturing of the vehicle occupant desired field-of-view sub-portion of the video stream, the second trigger comprising one of a second detected communication from the vehicle occupant head or eye-tracking device, a second audio signal from the vehicle occupant detected via the microphone, and a second electronic communication generated via activation of a switch or button indicative of the vehicle occupant's desire to stop capture of the vehicle occupant desired field-of-view sub-portion of the video stream;

sub-selecting, by the electronic processing device, from the video stream in time based on a timing of the first and second triggers and in field-of-view based on the identified vehicle occupant desired field-of-view sub-portion and creating a second modified video stream from the sub-selected portions of the video stream that is tailored to a POE of interest indicated by the vehicle occupant; and providing, by the electronic processing device, the second modified video stream to a target device for display, the target device selected from one or more of a vehicular console coupled to the vehicle, a mobile radio computing device associated with the vehicle occupant, a mobile radio computing device associated with another vehicle occupant other than the vehicle occupant, and a dispatch console.

2. The method of claim 1, wherein detecting the first trigger comprises detecting, by the electronic processing device, a threshold number of two or more vehicle occupants having a detected eye-gaze or head-direction facing in a same direction other than in a direction of travel of the vehicle.

3. The method of claim 2, wherein detecting the second trigger comprises detecting, by the electronic processing device, a threshold number of two or more vehicle occupants having a detected eye-gaze or head-direction transitioning from the same direction that is other than in the direction of travel of the vehicle to facing in a same direction that is in the direction of travel of the vehicle.

4. The method of claim 1, wherein detecting the first trigger comprises detecting, by the electronic processing device, the second audio signal, via the microphone input communicatively coupled to the electronic processing device, indicative of the vehicle occupant's indicated desire to capture the vehicle occupant desired field-of-view sub-portion of the video stream.

5. The method of claim 4, further comprising identifying the vehicle occupant desired field-of-view sub-portion of the video stream that is less than then an entire captured field-of-view of the video stream as a function of the second audio signal from the vehicle occupant identifying the viewing direction of the vehicle occupant.

6. The method of claim 1, wherein the identified vehicle occupant desired field-of-view sub-portion of the video stream varies from a time the first trigger is detected to a time the second trigger is detected.

7. The method of claim 6, wherein the identified vehicle occupant desired field-of-view sub-portion of the video stream is set to an initial value as a function of the first trigger or the separate electronic sensor input, and is then made to vary in position but not size as a function of a detected speed and/or direction of the vehicle.

8. The method of claim 6, wherein the identified vehicle occupant desired field-of-view sub-portion of the video stream is set to an initial value as a function of the first trigger or the separate electronic sensor input, and is then made to vary in position but not size as a function of a further detected change in eye gaze and/or head direction of the vehicle occupant.

9. The method of claim 1, wherein the vehicular camera comprises one or more cameras affixed to the vehicle and providing a 360° field-of-view surrounding the vehicle.

10. The method of claim 9, wherein the identified vehicle occupant desired field-of-view sub-portion of the video stream that is less than an entire captured field-of-view of the video stream is less than 90°.

11. The method of claim 1, wherein sub-selecting from the video stream in time based on a timing of the first and second triggers comprises continuing to sub-select from the video stream for a pre-determined period of time beyond a time at which the second trigger is detected, wherein the pre-determined period of time varies based on a detected speed of the vehicle.

12. The method of claim 1, further comprising identifying, by the electronic processing device, a central frame in time from the second modified video stream having a minimum level of blur, and one of providing the central frame to the target device prior to a remainder of the second modified video stream and transmitting an indication of the central frame to the target device accompanying the second modified video stream.

13. The method of claim 12, further comprising receiving, from the target device, an indication of a single frame from the second modified video stream that is selected by a user of the target device as best illustrating the POE of interest, and further transmitting the single frame to a plurality of additional target devices in a group of target devices to which the vehicle occupant is also subscribed.

14. The method of claim 13, further comprising receiving, from the target device, an indication of a sub-portion of the single frame from the second modified video stream that is selected by the user of the target device as including the POE of interest, and further modifying the single frame by the electronic computing device to highlight the sub-portion of the single frame or a detected POE in the sub-portion of the single frame prior to re-transmitting the single frame to the plurality of additional target devices in the group of target devices to which the vehicle occupant is also subscribed.

15. The method of claim 1, wherein the POE of interest is a face of a person outside of the vehicle, the method further comprising identifying, by the electronic processing device, a particular frame in time from the second modified video stream providing a highest face-recognition confidence level against a database of faces to match against, and one of providing the particular frame to the target device prior to a remainder of the second modified video stream and transmitting an indication of the particular frame to the target device accompanying the second modified video stream.

16. The method of claim 1, wherein the POE of interest is an object of interest outside of the vehicle, the method further comprising identifying, by the electronic processing device, a particular frame in time from the second modified video stream providing a highest object-recognition confidence level against a database of objects to match against, and one of providing the particular frame to the target device prior to a remainder of the second modified video stream and transmitting an indication of the particular frame to the target device accompanying the second modified video stream.

17. The method of claim 1, further comprising identifying the vehicle occupant desired field-of-view sub-portion of the video stream as a function of (i) the head direction information from the vehicle occupant head-tracking device identifying the direction in which the vehicle occupant's head is facing in the areas surrounding the vehicle such that the vehicle occupant desired field-of-view sub-portion of the video stream includes areas surrounding the vehicle matching the direction in which the vehicle occupant's head is facing or (ii) the eye gaze direction information from the vehicle occupant eye-tracking device identifying the direction in which the vehicle occupant's eyes are directed in the areas surrounding the vehicle such that the vehicle occupant desired field-of-view sub-portion of the video stream includes areas surrounding the vehicle matching the direction in which the vehicle occupant's eyes are directed.

18. The method of claim 1, further comprising identifying the vehicle occupant desired field-of-view sub-portion of the video stream that is less than then the entire captured field-of-view of the video stream as a function of the second audio signal from the vehicle occupant identifying the current viewing direction of the vehicle occupant in the areas surrounding the vehicle such that the vehicle occupant desired field-of-view sub-portion of the video stream includes areas surrounding the vehicle matching the current viewing direction identified in the second audio signal.

19. An electronic processing device for identifying a person, object, or entity (POE) of interest outside of a moving vehicle and of interest to a vehicle occupant and sub-select a video stream from a vehicular camera in corresponding time and field-of-view, the device comprising:
   a memory;
   a transceiver; and
   one or more processors configured to:
      receive, from a vehicular camera physically coupled to the vehicle, a video stream having a first field-of-view of an area surrounding the vehicle;
      detect a first trigger associated with a vehicle occupant's indicated desire to start capture of a vehicle occupant desired field-of-view sub-portion of the video stream that is less than an entire captured field-of-view of the video stream, the first trigger comprising one of a detected communication from a vehicle occupant head or eye-tracking device, an audio signal from the vehicle occupant detected via a microphone, and an electronic communication generated via activation of a switch or button indicative of the vehicle occupant's desire to start capture of the vehicle occupant desired field-of-view sub-portion of the video stream;
      identify the vehicle occupant desired field-of-view sub-portion of the video stream as a function of one of (i) head direction information from the vehicle occupant head-tracking device identifying a direction in which the vehicle occupant's head is facing in the areas surrounding the vehicle such that the vehicle occupant desired field-of-view sub-portion of the video stream includes areas surrounding the vehicle matching the direction in which the vehicle occupant's head is facing, (ii) eye gaze direction information from the vehicle occupant eye-tracking device identifying a direction in which the vehicle occupant's eyes are directed in the areas surrounding the vehicle such that the vehicle occupant desired field-of-view sub-portion of the video stream includes areas surrounding the vehicle matching the direction in which the vehicle occupant's eyes are directed, (iii) a second audio signal from the vehicle occupant identifying a current viewing direction of the vehicle occupant in the areas surrounding the vehicle such that the vehicle occupant desired field-of-view sub-portion of the video stream includes areas surrounding the vehicle matching the current viewing direction identified in the second audio signal, (iv) an optical signal identifying a pointing direction that the vehicle occupant's finger is pointing in the areas surrounding the vehicle such that the vehicle occupant desired field-of-view sub-portion of the video stream includes areas surrounding the vehicle matching the pointing direction in which the vehicle occupant's finger is pointed, and (v) user input from the vehicle occupant selecting one of a plurality of vehicle quadrants in the areas surrounding the vehicle such that the vehicle occupant desired field-of-view sub-portion of the video stream includes areas surrounding the vehicle matching the selected vehicular quadrant;

detect, by the electronic processing device, a second trigger indicative of the vehicle occupant's indicated desire to stop capture of the vehicle occupant desired field-of-view sub-portion of the video stream, the second trigger comprising one of a second detected communication from the vehicle occupant head or eye-tracking device, a second audio signal from the vehicle occupant detected via the microphone, and a second electronic communication generated via activation of a switch or button indicative of the vehicle occupant's desire to stop capture of the vehicle occupant desired field-of-view sub-portion of the video stream;

sub-select, by the electronic processing device, from the video stream in time based on a timing of the first and second triggers and in field-of-view based on the identified vehicle occupant desired field-of-view sub-portion and create a second modified video stream from the sub-selected portions of the video stream that is tailored to a POE of interest indicated by the vehicle occupant; and provide, via the transceiver, the second modified video stream to a target device for display, the target device selected from one or more of a vehicular console coupled to the vehicle, a mobile radio computing device associated with the vehicle occupant, a mobile radio computing device associated with another vehicle occupant other than the vehicle occupant, and a dispatch console.

20. The electronic processing device of claim 19, the one or more processors further configured to identify the vehicle occupant desired field-of-view sub-portion of the video stream as a function of (i) the head direction information from the vehicle occupant head-tracking device identifying the direction in which the vehicle occupant's head is facing in the areas surrounding the vehicle such that the vehicle occupant desired field-of-view sub-portion of the video stream includes areas surrounding the vehicle matching the direction in which the vehicle occupant's head is facing or (ii) the eye gaze direction information from the vehicle occupant eye-tracking device identifying the direction in which the vehicle occupant's eyes are directed in the areas surrounding the vehicle such that the vehicle occupant desired field-of-view sub-portion of the video stream includes areas surrounding the vehicle matching the direction in which the vehicle occupant's eyes are directed.

* * * * *